July 27, 1954    J. C. STRICKLER    2,684,691
MIXING VALVE
Filed July 25, 1949
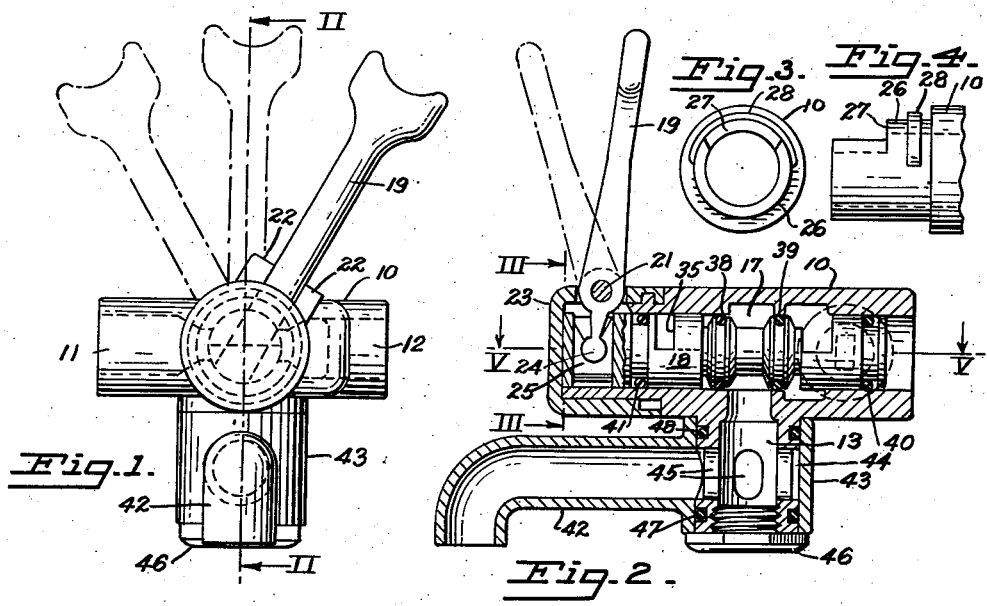
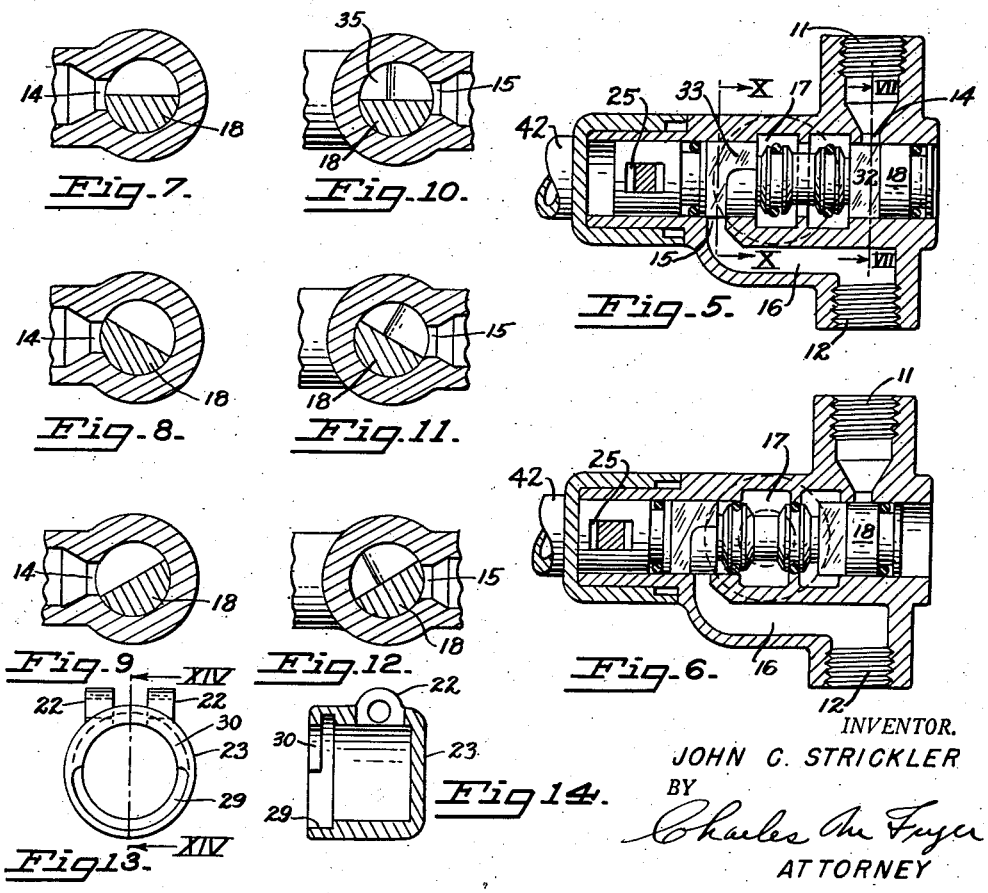
INVENTOR.
JOHN C. STRICKLER
BY
Charles M. Fryer
ATTORNEY Patented July 27, 1954

2,684,691

UNITED STATES PATENT OFFICE 2,684,691

MIXING VALVE

John C. Strickler, San Francisco, Calif.

Application July 25, 1949, Serial No. 106,530

4 Claims. (Cl. 137—625.17)

1

This invention relates to mixing valves of the kind employed to regulate the temperature of a liquid by proportioning the amount of flow from hot and cold sources of supply.

An object of the present invention is to provide a mixing valve of simple and durable construction capable of operation by a single handle or lever to regulate temperature from "all cold" to "all hot" and any desired mixture of the two and to regulate flow from zero or shut-off position to the maximum possible. Another object of the invention is to provide a mixing valve for controlling the admixture of two fluids under pressure through a piston-like valve element in such a manner that the pressures of the fluids will under no circumstances influence the piston-like valve element to move it away from any position at which it has been set. Another object of the invention is to provide such a valve wherein all controls are accomplished through a single movable valve part and wherein all wearing parts are readily accessible for service or replacement when necessary.

Further and more specific objects and advantages of the invention are made apparent in the following specification wherein reference is made to the accompanying drawings illustrating the invention in one of its preferred forms.

In the drawings:

Fig. 1 is a front elevational view of a mixing valve embodying the present invention;

Fig. 2 is a sectional view taken on the line II—II of Fig. 1;

Fig. 3 is a view in elevation of a portion only of the valve shown in Figs. 1 and 2 viewed from the line III—III in Fig. 2 with a cap part removed;

Fig. 4 is a fragmentary view in side elevation of the portion shown in Fig. 3;

Fig. 5 is a horizontal sectional view taken on the line V—V of Fig. 2 illustrating the positions of the valve parts in full open condition;

Fig. 6 is a view similar to Fig. 5 illustrating the positions of the same parts in their closed or shut-off condition;

Figs. 7, 8 and 9 are fragmentary views in section on the line VII—VII of Fig. 5 showing three different positions of the hot water control valve;

Figs. 10, 11 and 12 are similar views on the line X—X of Fig. 5 illustrating respectively the same positions of the cold water control valve;

Fig. 13 is a view in elevation of a cap member which closes one end of the valve chamber; and Fig. 14 is a sectional view taken on the line XIV—XIV of Fig. 13.

The valve disclosed in the drawings is of the faucet type with a delivery spout such as may be used over a sink or tray but this disclosure is intended only to illustrate the principles of the present invention and the spout portion may be eliminated so that the valve could be assembled in a pipe line as is customary in shower baths and other household or industrial equipment as will appear from the following description.

As shown in Figs. 1, 2, 5 and 6, the valve of the present invention has a substantially cylindrical body member 10 longitudinally bored for the passage of liquid and for the reception of the main valve element with a threaded connection 11 to admit hot water, a similar connection 12 to admit cold water and a discharge passage 13. Hot water may, therefore, enter the body of the valve through a port 14 and cold water through a port 15 by way of a passage 16 which communicates with the cold water inlet 12. The hot and cold water so entering the body of the valve may flow toward each other to a central mixing chamber 17 in controlled amounts to be discharged through the discharge passage 13 at any desired temperature. A valve spool 18 is reciprocably and rotatably mounted in the bore of the valve body and may be manipulated as by a handle or lever 19 to control by reciprocal movement the quantity of water delivered through the valve and by rotary or angular movement the temperature thereof.

The manner in which the valve spool 18 is connected with the lever 19 for manipulation thereby is best shown in Figs. 2, 3, 4, 13 and 14. The lever 19 is pivotally supported on a pin 21 carried in bosses 22, see Figs. 13 and 14, formed on a cap 23 which closes the forward end of the valve body. The cap 23 has a suitable opening through which the lower end of the lever enters for engagement with the valve member 18. The end of the lever carries a spherical journal 24 received in a bearing block 25 slidably disposed in a rectangular broached opening which extends through the valve member 18 adjacent its forward end. Consequently movement of the lever from the full line to the dotted line position of Fig. 2 will move the valve element from its Fig. 2 position to the open position illustrated in Fig. 5. The cap 23 is rotatably supported on the end of the valve body so that the lever 19 may be rocked through the positions shown in Fig. 1 and thus, also, impart rotary adjustment to the valve member 18.

The manner of securing the cap 23 to the valve body is illustrated in Figs. 3 and 4 showing the end of the valve body and Figs. 13 and 14 illustrating the cap itself. In Figs. 3 and 4, the valve body 10 is shown as having a reduced end portion 26 with its upper part cut away towards its outer end as illustrated at 27. It also carries a radially projecting thrust shoulder 28 throughout a portion of its periphery. The cap 23 has an internal diameter just sufficient to receive the reduced end of the valve body and its open end is enlarged as indicated in Figures 13 and 14 at 29 to slide over the thrust shoulder 28 when the cap is in an inverted position. A thrust flange 30 is arranged adjacent the edge of the cap to be received behind the thrust shoulder 28 when the cap is turned from an inverted to an upright position and withdrawal of the cap is thereby prevented.

Assembly of the lever and cap, together with the valve member 18, is accomplished by first assembling the journal 24 of the lever in its bearing block 25 then after the cap has been assembled onto the end of the body member, the lever with the bearing block 25 may be inserted through the opening in the cap and when the bearing block has been received in the recess in the valve member, the pin 21 is inserted and secured in place by any suitable means such as a threaded connection, not shown, between one of its ends and one of the bosses 22.

To control the flow of water through the hot inlet port 14 and the cold inlet 15, the valve member 18 is cylindrically formed at portions which close both of these ports when the valve member is in its normal position as shown in Figs. 2 and 6. The cylindrical parts of the valve member are cut away or relieved through half their diameter as at 32 adjacent the hot port 14 and 33 adjacent the cold port 15 so that upon pivotal movement of the lever 19 toward its dotted line position in Fig. 2, the valve member slides toward the rear and uncovers both of the ports 14 and 15 to any desired opening, the full open position being that illustrated in Fig. 5. This admits hot water through the bore of the valve, as is shown in Fig. 5, toward the central mixing chamber 17 and also admits cold water to the same chamber. The cylindrical part of the valve adjacent the cold water inlet is relieved on the side opposite the inlet as indicated at 35, see also Fig. 10, to provide space for the flow of the cold water through the bore of the valve body. With the cold water port 15 and the hot water port 14, either partially or fully opened by reciprocal movement of the valve member, the proportion of hot and cold water flowing toward the mixing chamber may be controlled by movement of the valve lever 19 from side to side or through the several positions illustrated in Fig. 1. During this movement the half relieved portions of the valve member 18 opposite the hot port 14, as shown in Figs. 7, 8 and 9, may assume a partially open, fully closed or fully open position, respectively, while the cold water port 15, as shown in Figs. 10, 11, and 12, will be partially opened, fully opened and fully closed, respectively, at the same time.

While the cylindrical portions of the valve element, if sufficiently closely fitted, may be relied upon to prevent leakage through the ports 14 and 15 when the valve is in its shut-off position, it may be desirable to avoid the necessary close manufacturing tolerances for this purpose and shut-off seals are therefore provided and carried by the valve member 18 as shown at 38 and 39. These seals are in the form of circular pliable gaskets usually referred to as O ring seals and are supported in suitable grooves in the valve member for cooperation with shoulders in the bore of the valve body adjacent the opposite sides of the mixing chamber 17. Thus the seals, as shown in Fig. 2, close communication between the inlet ports from the hot and cold water supply when the valve is in its closed position but opens such communication as shown in Fig. 5 when the valve is in its open position.

Leakage past opposite ends of the valve member is also preferably prevented by similar seals illustrated at 40 and 41 carried in grooves formed in the valve member and engaging the cylindrical wall of the bore in the valve body.

One of the advantages of the structure herein shown results from the fact that even though the valve element 18 is of piston-like construction slidable in a cylindrical bore, the pressures of the fluids entering the bore as well as the back pressure which may result if a restricted discharge opening is employed can in no case affect the position of the valve element. Consequently, the valve element will not slide or creep due to pressures within the valve and when the lever has been set in any desired position, it will remain in that position and the temperature and volume of the water will remain constant until the lever is moved manually. This results from the fact that both the hot water inlet and the cold water inlet communicate with cut away portions in the pistons or in other words, are introduced to the piston at ports intermediate its ends. Consequently, the fluid pressure acting on the piston acts equally in opposite directions at all times and there is no tendency for the piston to be moved away from the position in which it has been set. Likewise, any back pressure that would be created in the valve, as might occur if a spray nozzle were used, is exerted through the same passages and such pressure acts upon the valve element equally in opposite directions again prohibiting any tendency of the valve element to be moved.

A delivery spout 42 is illustrated as associated with the discharge opening 13 and has a cylindrical portion 43 which embraces the casting in which the discharge opening 13 is formed. This casting is circumferentially grooved as at 44 and has a plurality of ports 45 communicating from its inner bore to the passage 44 and thus to the discharge spout 42. A threaded plug 46 serves both to retain the spout in place and seal the lower open end of discharge passage 13. This construction permits swinging movement of the spout. Suitable seals, such as shown at 47 and 48, are employed to prevent leakage at the point of connection of the spout with the valve.

With the structure herein illustrated, an efficient, easily controlled and positively acting mixing valve is obtained with but a single valve element readily controlled by a single lever and easily removable for inspection or replacement. Manipulation of the operating lever will serve both to control volume without disturbing the temperature of the water and to control temperature without disturbing the volume of water discharged. Furthermore, the valve herein disclosed is simple in construction and neat in appearance and may be manufactured at relatively low cost.

I claim:

1. A mixing valve comprising a body having a generally cylindrical bore and longitudinally spaced apart inlet ports communicating with said bore for admitting fluids, said bore also having a mixing chamber intermediate said inlet ports, said body also having an outlet port communicating with said mixing chamber, a valve element mounted in said bore for reciprocation and partial rotation and having spaced apart substantially cylindrical portions of uniform diameter sealingly engaging said bore adjacent said inlet ports, said cylindrical portions being spaced apart a distance to simultaneously engage the bore between the mixing chamber and the respective inlet port to close both of said inlet ports in a predetermined axial position of said element to provide a closed position for said valve, the valve element having relieved portions along only a portion of its periphery adjacent each cylindrical portion, said relieved portions adapted to simultaneously register with the respective inlet port in the open position of said valve upon reciprocation of said element, one cylindrical portion being disposed in the mixing chamber which is of larger diameter than said one portion and the other portion being disposed on the side of the respective inlet port remote from the mixing chamber whereby the inlet ports are in communication with the mixing chamber through the respective reduced portion in the valve-open position, and means to rotate the valve element whereby the registry of said relieved parts with said inlet ports can be varied to thereby vary the proportion of flow through said inlet ports to the mixing chamber.

2. A mixing valve comprising a body having a generally cylindrical bore and longitudinally spaced apart inlet ports communicating with said bore for admitting fluids, said bore also having a mixing chamber intermediate said inlet ports, said body also having an outlet port communicating with said mixing chamber, a valve element mounted in said bore for reciprocation and partial rotation and having spaced apart substantially cylindrical portions fitting said bore adjacent said inlet ports, said cylindrical portions being spaced apart a distance to close both of said inlet ports in a predetermined axial position of said element to provide a closed position for said valve, each of said cylindrical portions having a part relieved along only a portion of its periphery and which is open to said mixing chamber to uncover the associated inlet port in another axial position of said valve element providing an open position for said valve, means to rotate the valve element whereby the registry of said relieved parts with said inlet ports can be varied to thereby vary the proportion of flow through said inlet ports to the mixing chamber, spaced apart substantially cylindrical sealing surfaces on the wall of said bore located between said mixing chamber and said inlet ports, and spaced apart annular sealing means on said valve element between said cylindrical portions thereof providing seals against said substantially cylindrical surfaces in said closed position of said valve element.

3. A mixing valve comprising a body having a generally cylindrical bore and longitudinally spaced apart inlet ports communicating with said bore for admitting fluids, said bore also having a mixing chamber intermediate said inlet ports, said body also having an outlet port communicating with said mixing chamber, a valve element mounted in said bore for reciprocation and partial rotation and having spaced apart substantially cylindrical portions fitting said bore adjacent said inlet ports, said cylindrical portions being spaced apart a distance to close both of said inlet ports in a predetermined axial position of said element to provide a closed position for said valve, each of said cylindrical portions having a part relieved along only a portion of its periphery and which is open to said mixing chamber to uncover the associated inlet port in another axial position of said valve element providing an open position for said valve, means to rotate the valve element whereby the registry of said relieved parts with said inlet ports can be varied to thereby vary the proportion of flow through said inlet ports to the mixing chamber, spaced apart substantially cylindrical sealing surfaces on the wall of said bore located between said mixing chamber and said inlet ports, and spaced apart annular sealing means on said valve element between said cylindrical portions thereof and with a reduced area therebetween providing seals against said substantially cylindrical surfaces in said closed position of said valve element, said mixing chamber being between said sealing surfaces and being of greater diameter than said sealing surfaces, and a portion of said bore between said mixing chamber and one of said inlet ports being also of greater diameter than said sealing surfaces to permit flow from said one inlet port past the sealing means in the open position of the valve element.

4. A mixing valve comprising a body having a generally cylindrical bore and longitudinally spaced apart inlet ports communicating with said bore for admitting fluids, said bore also having a mixing chamber intermediate said inlet ports, said body also having an outlet port communicating with said mixing chamber, a valve element mounted in said bore for reciprocation and partial rotation and having spaced apart substantially cylindrical portions fitting said bore adjacent said inlet ports, said cylindrical portions being spaced apart a distance to close both of said inlet ports in a predetermined axial position of said element to provide a closed position for said valve, each of said cylindrical portions having a part relieved along only a portion of its periphery and which is open to said mixing chamber to uncover the associated inlet port in another axial position of said valve element providing an open position for said valve, means to rotate the valve element whereby the registry of said relieved parts with said inlet ports can be varied to thereby vary the proportion of flow through said inlet ports to the mixing chamber, spaced apart substantially cylindrical sealing surfaces on the wall of said bore located between said mixing chamber and said inlet ports, spaced apart annular sealing means on said valve element between said cylindrical portions thereof and with a reduced area therebetween providing seals against said substantially cylindrical surfaces in said closed position of said valve element, said mixing chamber being between said sealing surfaces and being of greater diameter than said sealing surfaces, a portion of said bore between said mixing chamber and one of said inlet ports being also of greater diameter than said sealing surfaces to permit flow from said one inlet past the sealing means in the open position of the valve element, and the means to rotate said valve element including a member rotatably mounted on said body, and a control lever pivotally connected to said rotatable member and to said valve element for effecting axial movement of said valve element.

References Cited in the file of this patent

UNITED STATES PATENTS

| Number | Name | Date |
|---|---|---|
| 375,508 | Rodman | Dec. 27, 1887 |
| 789,026 | Huston | May 2, 1905 |
| 1,169,090 | Lucke | Jan. 18, 1916 |
| 1,872,626 | Ernst | Aug. 16, 1932 |
| 2,087,223 | Thompson | July 13, 1937 |
| 2,342,763 | Smith | Feb. 29, 1944 |
| 2,471,289 | Sedgwick | May 24, 1949 |
| 2,490,726 | Bauberger | Dec. 6, 1949 |

FOREIGN PATENTS

| Number | Country | Date |
|---|---|---|
| 281,616 | Italy | of 1931 |